United States Patent [19]

Suzuki et al.

[11] 4,131,632

[45] Dec. 26, 1978

[54] HEAT-RESISTANT RESIN COMPOSITIONS

[75] Inventors: Shuichi Suzuki, Yokohama; Moriyasu Wada, Kanagawa, both of Japan

[73] Assignee: Tokyo Shibaura Electric Co., Ltd., Kawasaki, Japan

[21] Appl. No.: 837,203

[22] Filed: Sep. 27, 1977

[30] Foreign Application Priority Data

Sep. 28, 1976 [JP] Japan .............................. 51-115443
Sep. 28, 1976 [JP] Japan .............................. 51-115444

[51] Int. Cl.$^2$ ...................... C08G 69/02; C08L 63/00
[52] U.S. Cl. ............................... 260/834; 260/830 P; 526/313
[58] Field of Search ........................... 260/834, 47 UA

[56] References Cited

U.S. PATENT DOCUMENTS

| 2,511,913 | 6/1950 | Greenlee | 260/834 |
| 3,026,285 | 3/1962 | Hirosawa | 260/834 |
| 3,310,602 | 3/1967 | Lemon et al. | 260/834 |
| 3,336,250 | 8/1967 | Koblitz | 260/834 |
| 3,336,257 | 8/1967 | Alvey | 260/834 |
| 3,697,462 | 10/1972 | De Hoff | 260/834 |
| 3,784,515 | 1/1974 | Freeman et al. | 260/834 |
| 3,839,493 | 10/1974 | Balme et al. | 260/834 |
| 3,840,495 | 10/1974 | Balme et al. | 260/47 UA |

FOREIGN PATENT DOCUMENTS

| 55926 | 11/1974 | Japan | 260/47 UA |
| 48-16061 | 5/1973 | Japan | 260/47 UA |

OTHER PUBLICATIONS

Journal of Chem. Soc.: K. M. Hui, 1970 (402).
Handbook of Epoxy Resins: Lee & Neville (1967) p. 25.
Catalogue of Toshiba Insulating Varnish, 1962, p. 3.

*Primary Examiner*—Herbert J. Lilling
*Attorney, Agent, or Firm*—Oblon, Fisher, Spivak, McClelland & Maier

[57] ABSTRACT

Resin compositions comprising maleimide compounds obtained by reacting maleic anhydride with mixed polyamines produced by reaction between aniline and formaldehyde; diallylbisphenol compounds; and epoxy resins. The compositions display prominent heat resistance when hardened.

17 Claims, No Drawings

HEAT-RESISTANT RESIN COMPOSITIONS

BACKGROUND OF THE INVENTION

I. Field of the Invention

This invention relates to heat-resistant resin compositions and more particularly to heat-resistant resin compositions adapted to be applied, for example, by impregnation, casting, lamination, molding or adhesion.

II. Description of the Prior Art

Electrical insulating material is generally desired to have high heat resistance from the standpoint of rendering electrical apparatuses compact and light and also elevating the safety and reliable performance thereof. A prominently heat-resistant, solventless, impregnation type resin in particular is demanded as electrical insulating material used with D.C. and A.C. motors and transformers.

Such heat-resistant resin known to date is an aromatic polyimide resin. However, this aromatic polyimide resin gives forth water during the hardening reaction. When, therefore, an attempt is made to provide a dense electrical insulating structure from the aromatic polyimide resin, the manufacturing conditions unavoidably become complicated. For this reason, the aromatic polyimide resin has hitherto been applied only as insulating covering or film for electric wires. Further, a widely accepted heat-resistant resin includes an epoxy resin derived from phenol novolak or cresol novolak. When, however, used long in an atmosphere or at a site in which a higher temperature than 150° C always prevails, the epoxy resin noticeably decreases in mechanical strength and electrical insulation, and has proved inadequate to be applied as electrical insulating material under such condition.

Another known heat-resistant resins are those mainly composed of a maleimide compound. When hardened, however, this maleimide resin becomes too brittle for practical application. To compensate for this drawback, customary practice has been to modify the maleimide resin by adding an additive. Such modifications already proposed to this end include, for example, those described in the Japanese Patent Application Publication 11,359/73 (bisimide + epoxy resin + carboxylic anhydride) and the following Japanese Patent Application Disclosures

- 1745/72 (bismaleimide + diamine + vinyl monomer)
- 32,944/74 (maleimide + diallylisophthalate)
- 47,487/74 (bismaleimide + allylamine + carboxylic acid allyl ester)
- 121,899/74 (bismaleimide + epoxy resin + amide acid imide)
- 2099/75 (bisimide + epoxy resin + monoimide + polyamine)
- 13,268/75 (bisimide + epoxy resin + polyamine)
- 13,497/75 (maleimide + epoxy resin + vinyl compound + metal chelate compound)
- 21,098/75 (polymaleimide + epoxy resin + hardening agent)
- 76,194/75 (maleimide + epoxy resin + diallylisophthalate polymer)
- 96,696/75 and 96,697/75 (polyimide + polyhydric phenol + catalyst)

However, any of the proposed compositions has the drawbacks that the maleimide compound has a relatively low compatibility with the above-listed additives and tends to give rise to sediments in the proximity of room temperature. Consequently it is necessary to restrict the content of the compound to less than 30% by weight on the basis of the total amount of the composition, and the resultant composition fails to show sufficient heat resistance. Further the Japanese Patent Application Disclosure 994/77 teaches a heat-resistant composition formed of maleimide compound, and alkenyl phenol and/or alkenyl phenol ether, which has low initial electric properties when hardened at a lower temperature than 200° C and lacks affinity to inorganic material such as glass cloth.

SUMMARY OF THE INVENTION

It is accordingly an object of this invention to provide a novel heat-resistant resin composition.

Another object of the invention is to provide a heat-resistant thermally hardenable resin composition useful in various applications including impregnation, casting, lamination, molding or adhesion.

Still another object of the invention is to provide a solvent less heat-resistant resin composition.

The heat-resistant resin composition of this invention comprises (A) a maleimide polymer obtained by reacting maleic anhydride with polyphenyl polyamines produced by reaction between aniline and formaldehyde; (B) at least one allylbisphenol compound represented by the general formula:

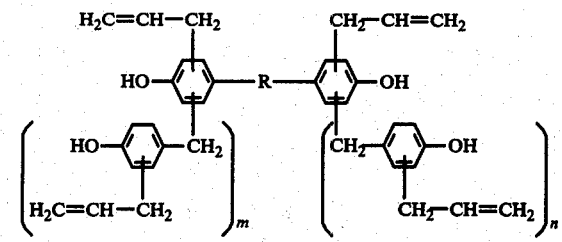

where R is -CH$_2$- group or

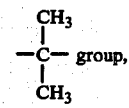

m and n are each independently zero, or an integer of 1, 2 or 3, each of the allyl groups is positioned ortho to each of the hydroxyl groups, and where R is

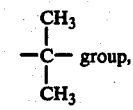

m and n respectively denote zero; and (C) at least one epoxy resin.

The above-mentioned maleimide polymer (A) has good compatibility with the allylbisphenol compound (B) and epoxy resin (C). The heat-resistant composition can be used as a solventless type composition.

DETAILED DESCRIPTION OF THE PREFERRED EMBODIMENTS

Component A

The component A of a heat-resistant resin composition according to this invention is a maleimide polymer obtained by reacting maleic anhydride with polyphenylpolyamines or mixed polyamines produced by reaction between aniline and formaldehyde. Unlike aniline-formaldehyde resin, this polyphenylpolyamine compound is a mixture of polyamines predominantly containing the repeating unit represented by the formula:

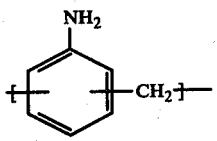

The polyamine generally contains 1 to 5 aniline units. The method of preparing the mixed polyamines is known to those skilled in the art. The process is set forth, for example, in the French Pat. Nos. 1,430,977; 1,481,935 and 1,533,696.

Generally, aniline and formaldehyde are reacted together in a mole ratio of 10:1 to 1.5:1 in the presence of a catalyst such as hydrochloric acid (preferred), sulfuric acid, benzenesulfonic acid, hydrobromic acid, acetic acid, phosphoric acid or salts thereof. The mole ratio of the aniline to the catalyst used ranges between 1:1 and 20:1. Where a volatile catalyst such as hydrochloric acid is used, the mole ratio of the catalyst to the aniline should not be decreased from 1:1. Though the reaction medium is generally water, it is possible to add alcohols or ketones, if desired. Where an aqueous medium is used, the reaction temperature is generally preferred to be 60 to 100° C.

The polyamine used in this invention generally has a viscosity (as measured at 25° C) of about 2,000 to about 50,000 centipoises, preferably 8,000 to 30,000 centipoises. The amine content is at least 15% by weight up to 16.5% by weight, preferably between 15.5% by weight and 16.2% by weight. One of such polyamines is commercially available from Mitsui-Nisso Polyurethane Inc. under a trade name "MDA-150".

The component A of the heat-resistant composition of this invention can be prepared by reacting the polyamines with maleic anhydride (with the ratio of amine equivalent to acid equivalent set at 1:1 or with the acid used in excess, preferably in the ratio ranging from 1:1.1 to 1:2) in an aprotic solvent such as dimethyl formamide, dimethyl acetamide or N-methyl-2-pyrrolidone to produce amic acid; and mixing the amic acid thus produced with a ring-closing agent such as lower carboxylic anhydride, tertiary amine, alkali or alkaline earth metal salt of an organic acid (for example acetic acid) and a catalyst. Where maleic anhydride is used in excess, then the excess portion of the anhydride acts as a ring-closing agent, making it unnecessary to employ any other ring-closing agent.

The polyamine and maleic anhydride are reacted together generally at a temperature of 0 to 30° C to produce amic acid and thereafter the amic acid is converted into imide at a temperature of 60 to 90° C in the presence of any of the above-mentioned ring-closing agents.

The polyphenylpolyamine thus prepared has good compatibility with the later described components B and C, and has a relatively low melting point (about 80 to 130° C).

Component B

The component B of the ternary heat-resistant resin composition of this invention is, as previously mentioned, at least one allylbisphenol compound which is expressed by the general formula:

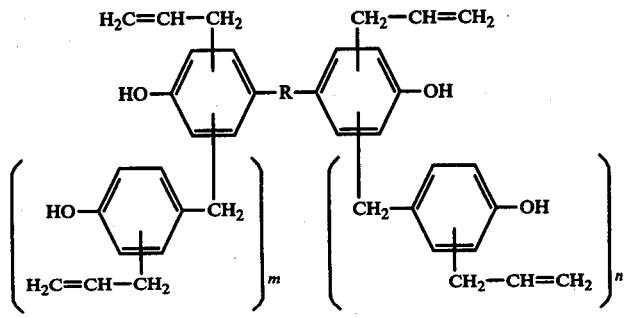

Formula I

In formula I, R is -CH$_2$- or

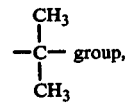

and each of the allyl groups is positioned ortho to each of the hydroxyl groups. m and n are each independently zero or an integer of 1, 2 or 3, and in the case where R is a

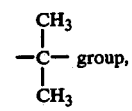

m and n denote zero. Where R is a -CH$_2$- group, a total of m and n is preferably 0 to 4.

The allylbisphenol compound B used in this invention can be prepared by various processes. For example, bisphenol A or bisphenol F expressed by the general structural formula II

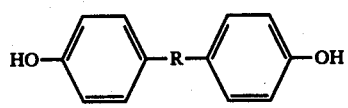

II (where R denotes the same group as in the general formula I) and allyl halide (for example, chloride or bromide) are reacted together under reflux in the equivalent ratio of 1:1 to 1:10, preferably 1:1 to 1:2 in the presence of an alkaline catalyst such as sodium hydroxide or potassium hydroxide to produce the corresponding diallyl ether of the bisphenol. Then, the diallyl ether is subjected to the Claisen rearrangement to provide diallylbisphenol in which each allyl group is positioned ortho to each -OH group. The process of the Claisen rearrangement is already known to those skilled in the art. See, for example, "The Claisen Rearrangement" in "Organic Reactions" by Goger Adams, Vol. II, 1944, published by John Wiley & Sons. Generally, the diallyl ether of bisphenol is converted into diallylbisphenol when heated to 180 to 250° C in a high boiling solvent such as a monoether of diethylene glycol. With the diallylbisphenol thus obtained, m and n given in the general formula I of course denote zero respectively.

The allylbisphenol compound of this invention can also be prepared by reacting orthoallylphenol with formaldehyde or acetone. The reaction with formaldehyde is generally carried out in the presence of an acid catalyst with the mole ratio of orthoallylphenol to formaldehyde ranging from 1:0.1 to 1:0.8 at a temperature of 60 to 150° C, using water as a solvent. This reaction produces allylbisphenol in which R of the general formula I denotes a methylene group, and m and n respectively represent an integer of 1 to 3.

Reaction between orthoallylphenol and acetone is carried out at a temperature of 30 to 80° C with the orthoallylphenol used in excess, optionally in the presence of a catalyst such as $FeCl_3$, $CaCl_2$, $H_3BO_3$ or $H_2S$, using a strong acid such as hydrochloric acid or sulfuric acid as a condensation agent. The mole ratio of phenol to acetone is generally about 3.5 to 6:1. The reaction an allylbisphenol compound in which the R of the general formula I denotes

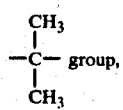

and m and n given in the formula respectively represent zero.

The allylbisphenol compound B has a relatively low viscosity of 400 to 30,000 centipoises as measured at 30° C, and contains allyl groups and hydroxyl groups in the molecule, thus making a great contribution to the later described hardening reaction.

Component C

The component C of the heat-resistant resin composition of this invention is at least one epoxy resin. As is well known, epoxy resin is a polymer whose molecules contains an epoxy functional group. The epoxy polymer has a polymerization degree of 2 to scores at most, and can be readily resinified by heat or a hardening agent.

Most epoxy resins are commercially available and can be used to provide the component C of the heat-resistant resin composition of this invention.

The epoxy resins include bisphenol A type epoxy resin, bisphenol F type epoxy resin, phenol novolak type epoxy resin, cresol novolak type epoxy resin, alicyclic epoxy resin, heterocyclic epoxy resin such as triglycidyl isocyanate or hydantoin epoxy resin, hydrogenated bisphenol A type epoxy resin, aliphatic epoxy resin such as propylene glycol-diglycidyl ether or pentaerythritol-polyglycidyl ether, epoxy resin obtained by reaction between aromatic carboxylic acid and epichlorohydrin, epoxy resin containing a spiro-ring, glycidyl ether type epoxy resin obtained by reaction between orthoallylphenol novolak compound and epichlorohydrin, and glycidyl ether type epoxy resin obtained by reaction between allylbisphenol compound constituting the component B of the heat-resistant resin composition of this invention and epihalohydrin such as epichlorohydrin and epibromohydrin.

For the manufacturing processes and concrete examples of epoxy resins, refer to "The Handbook of Epoxy Resins" by Henry Lee & Kris Neville (published by McGraw-Hill Book Company, 1967), "Epoxy Resins" by H. Kakiuchi (published by Shokodo K. K., Japan, 1967) or "Epoxy Resins" by K. Hashimoto, 7th edition (published by Nikkan Kogyo Shinbun-sha, Japan, 1976).

The physico-chemical properties of those of main commercially available epoxy resins which can be used with this invention are set forth in Table A below. Particularly preferred for the object of this invention are epoxy novolak (Epikote 152, 154; Araldite EPN 1138, 1139; and DEN 431, 438), bisphenol A type epoxy resin (Epikote 808, 812, 815, 828, 832; Araldite GY 252, 250, 260; DER 335, 334), cyclic epoxy resin (Chissonox 201, 221, available from Chisso Co., Ltd.), tetraglycidyl ether (Epikote 1031), and the reaction product of epihalohydrin with the component B of the invention.

Table A

| Trade mark | Specific density (20° C) (about) | Melting point °C (as measured by Durrans method) | Polymerization degree(n) (about) | Average molecular weight (about) | Epoxy equivalent | Viscosity (at 25° C) cps or Gardner-Holdt value | Color (max) Gardner |
|---|---|---|---|---|---|---|---|
| Shell | | | | | | | |
| Epikote 812[(1)] | — | — | | 306 | 150–170 | 120–200 | 3 |
| 815 | 1.139 | — | | 330 | 183–193 | 800–1,100 | 1 |
| 819 | 1.096 | — | | — | 180–220 | 200–500 | 1 |
| 827 | — | — | | — | 180–190 | 9,000–11,000 | 1 |
| 828 | 1.167 | 8–12 | 0 | 380 | 184–194 | 12,000–15,000 | 1 |
| 832 | — | — | | — | 185–200 | 13,000–16,000 | 1 |
| 834 | 1.181 | 20–28 | 1 | 470 | 230–270 | P - U[(b)] | 1[(a)] |
| 836 | — | 40–45 | | 710 | 290–335 | $A_1$ - B[(a)] | 5[(a)] |
| 1001 | 1.206 | 64–74 | 2.0 | 900 | 450–500 | D - F[(a)] | 1[(a)] |
| 1002 | — | 75–85 | | — | 600–700 | G - K | 1 |
| 1004 | 1.156 | 96–104 | 3.7 | 1,400 | 900–1,000 | Q - U[(a)] | 1[(a)] |
| 1007 | 1.147 | 122–131 | 8.8 | 2,900 | 1,750–2,100 | Y - $Z_1$[(a)] | 1[(a)] |
| 1009 | 1.190 | 144–158 | 12.0 | 3,750 | 2,400–3,000 | $Z_3$ - $Z_6$[(a)] | 1[(a)] |
| 1040 | — | 52–62 | | — | 375–425 | B - D[(a)] | 5[(a)] |
| 1031[(2)] | — | 75[(c)] | | 703 | 200–240 | $Z_2$ - $Z_7$[(a)] | — |
| 871[(3)] | — | — | | — | 390–470 | 400–900 | 12 |
| 872[(3)] | — | — | | — | 650****** | | |

The proportions of the components A, B and C of the ternary heat-resistant resin composition of this invention can be suitably selected according to the applications to which the resin composition is put and the degree of heat resistance demanded thereof. Generally, the heat-resistant resin composition contains such amounts of the three components A, B and C as admit of their mutual reactions and render said resin composition as whole prominently resistant to heat. The component A preferably has a proportion ranging from about 10 to about 85% by weight, especially from about 30 to about 60% by weight. The component B preferably has a proportion ranging between about 5 and about 70% by weight, especially between about 10 and about 40% by weight. The component C preferably has a proportion ranging from about 5 to 80% by weight, especially from about 10 to about 40% by weight.

While the three components A, B and C are indispensable to the subject heat-resistant resin composition, part (generally 60% by weight at maximum) of the component A may be replaced by N,N-substituted bismaleimide such as N,N'-ethylene bismaleimide, N,N'-o- or -p-phenylene bismaleimide, N,N'-hexamethylene bismaleimide, N,N'-methylene-di-p-phenylene bismaleimide, N,N'-oxy-di-p-phenylene bismaleimide, N,N'-xylylene bismaleimide, N,N'-{ (3,3'-dimethyl)p,p'-diphenyl-methane} bismaleimide, N,N'-(3,3'-dichloro-p,p'-biphenylene) bismaleimide, N,N'-4,4'-benzophenone bismaleimide, and N,N'-3,3'-diphenyl-sulfone bismaleimide; and N-substituted monomaleimide such as N-phenyl maleimide, N-(lower alkyl-substituted phenyl) maleimide, N-(lower alkoxy-substituted phenyl) maleimide, and N-lower alkyl maleimide (for example, N-propyl maleimide).

The heat resistant resin composition of this invention varies in viscosity according to the proportion of the respective components A, B and C, but may be used in the socalled solventless form. Therefore, the resin composition is not only adapted to be applied by casting or molding, but also is readily soluble in an inert low boiling solvent such as dioxane or tetrahydrofuran, and can be impregnated in, for example, glass cloth or nonwoven fabric, thus proving useful for manufacture of a laminate. Since the components A, B and C have good mutual compatibility, the resin composition as a whole presents a uniform hardened structure. Once hardened, the resin composition displays prominent heat resistance, mechanical strength and electrical insulation. Where, therefore, used long in an atmosphere or at a site in which as high a temperature as 180 to 200° C always prevails, the resin composition little decreases in the above-mentioned properties.

The resin composition of this invention can be easily hardened not only by being heated to a temperature of 170 to 180° C, but also by being heated to a temperature of 160 to 180° C with a hardening agent or hardening promoter added in advance or at the moment of hardening. The hardening agent includes various anhydrides such as 3- or 4-methyl-tetrahydrophthalic anhydride, tetrahydrophthalic anhydride, hexahydrophthalic anhydride, nadic anhydride, methylnadic anhydride, succinic anhydride, methylsuccinic anhydride, dodecylsuccinic anhydride and octadecylsuccinic anhydride; phenolic compounds such as bisphenol A, bisphenol F, bisphenol S, resorcin, pyrogallol, catechol, hydroquinone and phenolic resins such as those obtained by reaction between phenol and aldehydes or ketones; isocyanate compounds such as diphenylmethaneisocyanate, tollylenediisocyanate, diphenylsulfonediisocyanate and diphenyletherdiisocyanate; aromatic amine compounds such as phenylenediamine, diaminodiphenylmethane, diaminodiphenylether, diaminodiphenylsulfone and diaminodiphenylsulfide and halogen- or alkyl-substituted compounds thereof; aliphatic amine compounds such as ethylene diamine and hexamethylenediamine; and many other amine compounds obtained by reaction between aniline and aldehydes. The above-listed hardening agents are added at the ratio of 1.2 or less equivalent per equivalent of the epoxy group.

The hardening promoters include peroxides such as dicumyl peroxide, tert-butyl peroxide, tert-butyl perbenzoate, methyl ethyl ketone peroxide, di-tert-butyl peroxide, tert-butyl hydroperoxide, and azoisobutyronitrile; boron trifluoride-amine complexes such as boron trifluoridemonoethylamine complex and boron trifluoride-piperidine complex; tertiary amines such as triethylamine, benzyldimethylamine and dimethylaniline; imidazole compounds such as N-methyl imidazole, N-ethyl imidazole, N-vinyl imidazole and N-phenyl imidazole; borates such as triphenyl borate and tricresyl borate; metal acetylacetonates such as titanium acetylacetonate and iron acetylacetonate; metal alkoxides such as tetrabutyltitanate; quaternary ammonium salts; and dicyane diamide. The above-listed hardening promoters should preferably be added at the ratio of about 0.001 to about 20% by weight based on the total amount of the heat-resistant resin composition of this invention.

The resin composition of this invention can be stored at room temperature in a stable condition (that is, without being substantially hardened) for at least about six months.

This invention will be more fully understood from the following examples. All parts and percentages are by weight, unless otherwise indicated.

EXAMPLE 1

(A) A 5l three-way flask equipped with a stirrer, thermometer and reflux condenser was charged with 900 grams of mixed polyamines MDA-150 obtained by reaction between aniline and formaldehyde, containing 15.9% of amine group, and had a viscosity of 16,000 cps at 40° C, manufactured by Mitsui-Nisso Polyurethane K.K., 400 grams of sodium acetate and 1,300 grams of dimethylformamide. The mixed mass was heated one hour at 60 to 70° C with stirring and then cooled to room temperature. Thereafter, 900 grams of maleic anhydride were added with the temperature maintained at a lower lever than 40° C, and the mixture was stirred one hour. With the temperature raised to 80° C, the mixture was again stirred 1.5 hours. After cooled to room temperature, the mixture was mixed with 1,020 grams of acetic anhydride, followed by stirring for 2 hours at a temperature of 80 to 90° C. After cooled to room temperature, the mixture was poured into water having an amount 6 to 8 times that of the mixture to precipitate. The precipitate was collected by filtration. The collected precipitate was washed twice with warm water at 50° C and once with cool water, and dried in vacuum, providing the desired maleimide polymer A with a yield of 98%.

(B) 228 grams (1 mol) of bisphenol A was dispersed in 600ml of toluene. 500ml of an aqueous solution containing 112 grams of potassium hydroxide was poured to render the whole solution transparent, and 233 grams (2.1 mols) of allyl bromide was slowly added. Reaction was continued for 3 hours under reflux. The reaction mixture was cooled to room temperature, and divided into the toluene phase and water phase by a separatory funnel. After the toluene phase was thoroughly washed with water, toluene and unreacted monomers were distilled out under vacuum. The Claisen rearrangement was caused to arise in the distillate, providing the desired diallylbisphenol A compound having a viscosity of 15 to 20 poises at 30° C (C) A 92.53 gram portion (0.3 mol) of the diallylbisphenol A compound obtained by the process (B) and 74.0 grams (0.8 mol) of epichlorohydrin were stirred together one hour at a temperature of 80 to 95° C in the presence of 24 grams of sodium hydroxide. After the mass was washed with water, the separated resin phase was subjected to stripping, providing the desired glycidyl ether type epoxy resin A having a viscosity of 35 to 40 poises at 30° C.

Seven kinds of solventless type resin compositons were prepared by blending the maleimide polymer A, diallylbisphenol A compound, epoxy resin A, Epikote 828, Araldite EPN-1138, hardening agent HN-2200 of methyltetrahydrophthalic anhydride (manufactured by Hitachi Kasei K.K.), hardening agent and hardening promoter in the proportions (parts by weight) shown in Table 1 below. The respective resin compositions were cast in molds, followed by heating for 2 hours at 150° C and for 12 hours at 200° C to obtain hardened boards 1mm thick. A plurality of chips measuring 10mm×10mm were cut out from each of the seven molded resin boards. Some of the chips were used in measuring the heating weight loss of the resin board, and the remainder offered to test the electrical properties of the resin boards. The results are set forth in Table 1 below.

Table 1

|  |  | 1 | 2 | 3 | 4 | 5 | 6 | 7 |
|---|---|---|---|---|---|---|---|---|
| Maleimide compound A | | 60 | 50 | 45 | 40 | 40 | 30 | 30 |
| Diallylbisphenol A compound | | 20 | 20 | 25 | 25 | 30 | 40 | 30 |
| Epoxy resin | Epoxy resin A | 20 | 20 | 30 | 20 | 12 | 15 | 35 |
| | Epikote 828 | — | — | — | — | — | 5 | — |
| | Araldite EPN-1138 | — | — | — | 15 | 10 | 10 | 5 |
| Hardening agent and hardening promoter | HN-2200 | — | 10 | — | — | 8 | — | — |
| | N,N-dimethylbenzylamine | 0.3 | 0.2 | 0.2 | 0.2 | — | 0.3 | — |
| | BF$_3$-monoethylamine | — | — | — | — | 3.0 | — | 3.0 |
| | Dicumyl peroxide | 1.5 | 1.1 | 1.1 | 1.1 | 1.5 | 1.5 | 1.5 |
| Heating weight loss(%) | 200° C × 1,000hrs. | 3.3 | 3.8 | 3.9 | 3.8 | 3.7 | 4.3 | 4.1 |
| | 240° C × 1,000hrs. | 5.2 | 5.9 | 5.9 | 5.7 | 5.9 | 6.5 | 6.2 |
| Volume resistivity 180° C (Ω·cm) | | 4.3×10$^{13}$ | 8.8×10$^{12}$ | 8.9×10$^{12}$ | 7.5×10$^{12}$ | 7.7×10$^{12}$ | 2.2×10$^{12}$ | 1.8×10$^{12}$ |
| Dissipation factor 180° C (%) | | 0.91 | 1.10 | 1.24 | 1.35 | 1.47 | 1.81 | 1.70 |

EXAMPLE 2

All the components used in Example 1, and diglycidyl ether type epoxy resin Epiclon 830 (manufactured by Dainippon Ink & Chemicals, Inc. Japan) were blended in the proportions (parts by weight) given in Table 2 below, preparing five kinds of resin composition. The respective resin compositions were made into thermally hardened resin boards in the same manner as in Example 1. The resin boards were tested for tensile strength, the results being presented in Table 2 below.

The above-mentioned resin composition was coated on part of the surface of an iron plate measuring 25mm wide, 120mm long and 1mm thick. The surface was previously roughened by being abraided by a piece of sandpaper and degreased. Another iron plate having the same measurement was partly placed on the above-mentioned resin-coated portion of the first iron plate so as to cause the overlapping section of the iron plate assembly to occupy an area of 3cm$^2$. The two iron plates were stuck together with the resin composition by applying for one hour a pressure of 0.5 to 2 kg/cm$^2$ at a temperature of 170° C. The assembled plates were after-cured for 15 hours at a temperature of 200° C, to be used as a sample to measure the shear strength of the bonded section. A plurality of samples of the same kind were provided. The shear strength of the bonded section of each sample was tested at room temperature and a temperature of 150° C, the result being set forth in Table 2 below.

Table 2

|  |  | Sample | | | | |
|---|---|---|---|---|---|---|
|  |  | 8 | 9 | 10 | 11 | 12 |
| Maleimide compound A | | 50 | 40 | 30 | 40 | 50 |
| Diallylbisphenol A compound | | 20 | 30 | 30 | 30 | 25 |
| Epoxy resin | Epoxy resin A | 15 | 30 | 20 | 20 | 13 |
| | Epikote 828 | — | — | — | 10 | — |
| | Epiclon 830* | — | — | 10 | — | — |
| | Araldite EPN-1138 | — | — | 10 | — | — |
| Hardening agent and hardening promoter | HN-2200 | 15 | — | — | — | 12 |
| | N,N-dimethylamine | 0.1 | 0.2 | — | 0.2 | 0.2 |
| | BF$_3$-monoethylamine | — | — | 0.3 | — | — |
| | Dicumyl peroxide | 1.1 | 1.5 | 1.5 | — | 1.1 |
| Tensile strength (kg/cm$^2$) | Room temperature | 11.1 | 10.2 | 12.5 | 9.6 | 9.8 |
| | 150° C | 7.2 | 7.0 | 6.5 | 6.8 | 7.1 |
| Shear strength of the bonded section (kg/cm$^2$) | Room temperature | 115 | 120 | 130 | 118 | 125 |
| | 150° C | 101 | 98 | 87 | 93 | 108 |

*An epoxy resin obtained by reaction between bisphenol F and epichlorohydrin and having an epoxy equivalent of 180, a viscosity of 3,000 cps (at 25° C) and a specific density of 1.18 (at 25° C).

EXAMPLE 3

350 parts of the maleimide polymer A prepared in Example 1, ↓ parts of the diallylbisphenol A compound prepared in Example 1, 50 parts of the epoxy resin A prepared in Example 1, and 25 parts of Araldite EPN-1138 were dissolved in 500 parts of dioxane with stirring at 60 to 80° C. 5 parts of dicumyl peroxide and 0.5 part of N,N-dimethylbenzylamine were added to the solution.

A resin solution thus prepared was impregnated in a plain-woven glass cloth measuring 200mm×200mm which was previously treated with aminosilane. After air-dried, the impregnated glass cloth was further thermally dried 30 minutes at a temperature of 150° C, providing a prepreg sheet having about 45% deposition of resin. Seven other prepreg sheets of the same kind were prepared. Eight prepreg sheets thus obtained were placed one atop another. The assembly of the prepreg sheets was pressurized one hour by a press heated to 180° C to form a sample laminate board. A plurality of sample laminate boards of the same kind were provided. Each sample laminate board was after-cured 5 hours at a temperature of 200° C. A heating weight loss occurring in the laminate board which was further heated 1,000 hours at a temperature of 240° C was measured to be 4.2%. The bending strength of the laminate board measured after the heating accounted for 73% of the initial value. After the sample laminate boards were heated under varying conditions, their electric properties were measured at room temperature, the results being presented in Table 3 below.

Table 3

|  | Volume resistivity (Ω·cm) | Dissipation factor (%) |
|---|---|---|
| 200° C × 1,000hrs. | $10^{15} <$ | 0.04 |
| 225° C × 1,000hrs. | $8.7 \times 10^{14}$ | 0.14 |
| 240° C × 1,000hrs. | $6.5 \times 10^{13}$ | 0.39 |

EXAMPLE 4

(A) A maleimide compound B of substantially the same kind as that obtained in Example 1 (A) was prepared, excepting that the content of amino group in the mixed polyamines MDA-150 was 15.7%, and said maleimide compound B indicated a viscosity of 10,600 cps (at 30° C).

404.5g (2 mols) of bisphenol F compound* obtained by reaction between phenol and formalin (manufactured by Dainippon Ink & Chemicals, Inc. Japan under a trademark "DIC-BPF") and 160g of sodium hydroxide were dissolved in 2l of water with stirring. After the solution became clear, allyl bromide was slowly dripped for reaction. After the reaction continued about 10 hours at a temperature of 80 to 110° C, a water phase was taken out of the reacted mass by a separatory funnel. The remaining resin phase was washed with water. Unreacted reactants and water were removed in vacuum. Thereafter, the Claisen rearrangement was caused to take place in the resin phase, providing the desired bisallylphenol F compound having a viscosity of 8 to 10 poises (at 30°C).

(* the bisphenol F compound is expressed by the general formula

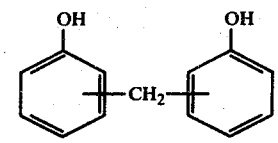

and contains 20% of the ortho-ortho type, 50% of the orthopara type and 30% of the para-para type) 147.2g of said bisallylphenol F compound and 110g of epichlorohydrin were reacted one hour in water at 80 to 90° C in the presence of 40g of sodium hydroxide, providing the desired glycidyl ether type epoxy resin B having a viscosity of 17 to 23 poises (at 30° C).

Seven kinds of resin composition were prepared by blending the maleimide compound B, epoxy resin B, diallylbisphenol A compound of Example 1 (B), DEN 438, and in addition a hardening agent and hardening promoter in the proportions (parts by weight) given in Table 4 below. A resin board was prepared from the respective resin compositions in the same manner as in Example 1. A plurality of chips measuring 10mm × 10mm were cut out of each resin board. Measurement was made of the heating weight loss and electrical properties of the sample chips, the results being set forth in Table 4 below.

Table 4

|  |  | Sample | | | | | | |
|---|---|---|---|---|---|---|---|---|
|  |  | 13 | 14 | 15 | 16 | 17 | 18 | 19 |
| Maleimide compound B | | 40 | 50 | 45 | 30 | 40 | 20 | 40 |
| Diallylbisphenol A compound | | 25 | 20 | 22 | 20 | 10 | 25 | 30 |
| Epoxy resin | Epoxy resin B | 35 | 30 | 23 | 15 | 20 | — | — |
|  | DEN 438 | — | — | 5 | 15 | 10 | 25 | 20 |
| Hardening agent and hardening promoter | Methylnadic anhydride | — | — | 5 | — | — | — | — |
|  | HN-2200 | — | — | — | 20 | 20 | 30 | 10 |
|  | N,N-dimethylaniline | 0.2 | 0.2 | 0.2 | 0.2 | 0.2 | 0.2 | 0.2 |
|  | Dicumyl peroxide | 1.5 | 1.5 | 1.5 | 1.5 | 1.5 | 1.5 | 1.5 |
| Heating weight loss (%) | 200° C × 1,000hrs. | 3.7 | 3.3 | 3.6 | 4.3 | 3.6 | 5.0 | 3.5 |
|  | 240° C × 1,000hrs. | 6.1 | 5.4 | 5.8 | 6.7 | 6.0 | 8.6 | 5.8 |
| Volume resistivity 180° C (Ω·cm) | | $4.1 \times 10^{12}$ | $1.4 \times 10^{13}$ | $2.0 \times 10^{13}$ | $3.0 \times 10^{12}$ | $2.3 \times 10^{13}$ | $7.1 \times 10^{11}$ | $3.7 \times 10^{12}$ |
| Dissipation factor 180° C (%) | | 1.34 | 0.97 | 1.22 | 1.74 | 1.57 | 3.58 | 1.46 |

EXAMPLE 5

(A) 268.4g of orthoallylphenol, and 32.43g of 37% aqueous formalin solution were reacted 2 to 3 hours in the presence of 0.2 mol of 35% hydrochloric acid at a temperature of 80 to 90° C, providing an allylbisphenol F compound in which R of the aforesaid general formula I represented a methylene group, and a total of m and n given in said general formula I was zero to 6 and which had a viscosity of 10 to 15 poises (at 30° C).

(B) 117.8g of the above-mentioned allylbisphenol F compound and 92.5g of epichlorohydrin were reacted 1.5 hours in water containing 32g of sodium hydroxide used as a catalyst at a temperature of 80 to 85° C, producing the desired glycidyl ether type epoxy resin C having a viscosity of 17 to 23 poises (at 30° C).

The allylbisphenol F compound, epoxy resin C, maleimide polymer A of Example 1 (A), and in addition another epoxy resin and a hardening agent and hardening promoter were blended in the proportions (parts by weight) shown in Table 5 below, providing seven kinds of resin composition. A hardened resin board was prepared from the respective resin compositions in the same manner as in Example 1. A plurality of chips measuring 10mm × 10mm were cut out of each resin board. Measurement was made of the heating weight loss and electrical properties of the sample chips, the results being indicated in Table 5.

Table 5

| | | Sample | | | | | | |
|---|---|---|---|---|---|---|---|---|
| | | 20 | 21 | 22 | 23 | 24 | 25 | 26 |
| Maleimide compound A | | 60 | 50 | 50 | 40 | 40 | 30 | 30 |
| Allylbisphenol F compound | | 20 | 20 | 25 | 20 | 30 | 40 | 30 |
| Epoxy resin | Epoxy resin C | 20 | 20 | 25 | 20 | 10 | 10 | 30 |
| | Epikote 828 | — | — | — | — | — | 10 | — |
| | Araldite EPN-1138 | — | — | — | 20 | 10 | 10 | 10 |
| Hardening agent and hardening promoter | HN-2200 | — | 10 | — | — | 10 | — | — |
| | N,N-dimethylbenzylamine | 0.3 | 0.1 | 0.2 | 0.2 | — | 0.3 | — |
| | BF$_3$-monoethylamine | — | — | — | — | 3.0 | — | 3.0 |
| | Dicumyl peroxide | 1.1 | 1.1 | 1.1 | 1.1 | 1.5 | 1.5 | 1.5 |
| Heating weight loss (%) | 200° C × 1,000hrs. | 3.1 | 3.7 | 3.4 | 3.7 | 3.8 | 4.1 | 4.0 |
| | 240° C × 1,000hrs. | 5.0 | 5.6 | 5.4 | 5.7 | 5.9 | 6.3 | 6.0 |
| Volume resistivity 180° C (Ω-cm) | | $4.5 \times 10^{13}$ | $1.2 \times 10^{13}$ | $9.8 \times 10^{12}$ | $9.2 \times 10^{12}$ | $8.3 \times 10^{12}$ | $5.5 \times 10^{12}$ | $6.4 \times 10^{12}$ |
| Dissipation factor 180° C (%) | | 0.88 | 1.04 | 1.22 | 1.38 | 1.43 | 1.73 | 1.65 |

EXAMPLE 6

The maleimide polymer A of Example 1 (A), allylbisphenol F compound of Example 5 (A), epoxy resin C of Example 5 (B) and in addition another epoxy resin, and a hardening agent and hardening promoter were blended in the proportions (parts by weight) given in Table 6 below, providing seven kinds of resin composition. Measurement was made of the viscosity of the seven resin compositions, the results being shown in Table 6 below.

A hardened resin board was prepared from the respective resin compositions in the same manner as in Example 1. A plurality of chips measuring 10mm×10mm were cut out of each resin board. Measurement was made of the tensile strength of the respective sample chips. Further, special samples were prepared in the same manner as in Example 2 to test the shear strength of the bonded section, the results being also given in Table 6 below.

tion. Reaction was continued 3 hours at a temperature of 60 to 80° C. The water phase and resin phase were separated as the result of reaction. The separated water phase was removed by a separatory funnel. The unreacted compound were distilled out of the resin phase in vacuum. The Claisen rearrangement was caused to occur in the resin phase, providing the desired diallylbisphenol A compound having a viscosity of 15 to 20 poises (at 30° C). 154.2g (0.5 mol) of the diallylbisphenol A compound and 120.3g (1.3 mols) of epichlorohydrin were mixed and stirred one hour in the presence of 40g of sodium hydroxide at a temperature of 80 to 85° C. After washed with water, the mixture was subjected to stripping, providing the desired glycidyl ether type epoxy resin D having a viscosity of 30 to 40 poises (at 30° C).

Seven kinds of resin composition were prepared by blending the epoxy resin D, maleimide compound B of Example 4 (A), allylbisphenol F compound of Example 5 (A) and in addition another epoxy resin and a hardening agent and hardening promoter. A thermally hardened board was prepared from each of the seven kinds Table 6

| | | Sample | | | | | | |
|---|---|---|---|---|---|---|---|---|
| | | 27 | 28 | 29 | 30 | 31 | 32 | 33 |
| Maleimide compound A | | 50 | 40 | 25 | 30 | 40 | 50 | 30 |
| Allylbisphenol F compound | | 20 | 30 | 38 | 30 | 30 | 25 | 20 |
| Epoxy resin | Epoxy resin C | 15 | 30 | 37 | 20 | 20 | 13 | 20 |
| | Epikote 828 | — | — | — | — | 10 | — | — |
| | Epiclon 830 | — | — | — | 10 | — | — | — |
| | Araldite EPN-1138 | — | — | — | 10 | — | — | 10 |
| Hardening agent and hardening promoter | HN-2200 | 15 | — | — | — | — | 12 | 20 |
| | N,N-dimethylbenzylamine | 0.1 | 0.2 | 0.3 | — | 0.2 | 0.2 | 0.1 |
| | BF$_3$-monoethylamine | — | — | — | 0.3 | — | — | — |
| | Dicumyl peroxide | 1.1 | 1.5 | 1.1 | 1.5 | — | 1.1 | 1.5 |
| Viscosity (poises) | 80° C | 19.5 | 13.0 | 4.5 | 11.6 | 14.5 | 15.6 | 3.7 |
| | 100° C | 6.7 | 3.2 | 1.3 | 2.7 | 4.0 | 4.2 | 1.0 |
| Tensile strength (kg/cm$^2$) | Room temperature | 10.7 | 9.8 | 10.0 | 11.3 | 9.7 | 11.0 | 12.1 |
| | 150° C | 7.4 | 7.0 | 5.9 | 6.8 | 7.0 | 7.6 | 6.6 |
| Shearing strength of the bonded section (kg/cm$^2$) | Room temperature | 116 | 122 | 130 | 128 | 119 | 113 | 126 |
| | 150° C | 104 | 97 | 75 | 85 | 95 | 110 | 83 |

EXAMPLE 7

228g (1 mol) of bisphenol A and 242g (2 mols) of allyl bromide were dissolved in 1l of water. 112.2g (2 mols) of potassium hydroxide was added to the aqueous soluof resin composition in the same manner as in Example 1. Measurement was made of the heating weight loss and electric properties of the respective hardened resin boards, the results being set forth in Table 7 below.

Table 7

| | | Sample | | | | | | |
|---|---|---|---|---|---|---|---|---|
| | | 34 | 24 | 36 | 37 | 38 | 39 | 40 |
| Maleimide compound B | | 40 | 50 | 50 | 30 | 40 | 20 | 40 |
| Allylbisphenol F compound | | 30 | 20 | 20 | 20 | 10 | 20 | 30 |
| Epoxy resin | Epox resin D | 30 | 30 | 20 | 10 | 20 | — | — |
| | DEN 438 | — | — | 5 | 20 | 10 | 30 | 20 |
| Hardening | Methylnadic anhydride | — | — | 5 | — | — | — | — |

Table 7-continued

| | | Sample | | | | | | |
|---|---|---|---|---|---|---|---|---|
| | | 34 | 24 | 36 | 37 | 38 | 39 | 40 |
| agent and | HN-2200 | — | — | — | 20 | 20 | 30 | 10 |
| hardening | N,N-dimethylamine | 0.3 | 0.2 | 0.2 | 0.2 | 0.1 | 0.2 | 0.4 |
| promoter | Dicumyl peroxide | 1.5 | 1.1 | 1.1 | 1.1 | 1.1 | 1.1 | 1.5 |
| Heating weight | 200° C × 1,000hrs. | 3.9 | 3.5 | 3.8 | 4.1 | 3.8 | 4.9 | 3.7 |
| loss(%) | 240° C × 1,000hrs. | 6.3 | 5.5 | 5.7 | 6.5 | 6.1 | 8.4 | 6.0 |
| Volume resistivity 180° C (Ω·cm) | | $3.3 \times 10^{12}$ | $1.8 \times 10^{13}$ | $1.0 \times 10^{13}$ | $2.9 \times 10^{12}$ | $2.2 \times 10^{12}$ | $6.8 \times 10^{11}$ | $6.5 \times 10^{12}$ |
| Dissipation factor 180° C (%) | | 1.51 | 1.00 | 1.13 | 1.55 | 1.60 | 3.24 | 1.42 |

EXAMPLE 8

350 parts of the maleimide compound A of Example 1 (A), 75 parts of the allylbisphenol F of Example 5 (A), 50 parts of the epoxy resin C of Example 5 (B) and 25 parts of Araldite EPN 1138 were dissolved in 500 parts of dioxane with stirring at a temperature of 60 to 80° C. 5 parts of dicumyl peroxide and 0.5 part of N,N-dimethylbenzylamine were added to the solution.

A plurality of sample laminate boards were prepared from the above-mentioned resin solution in the same manner as in Example 3. The heating weight loss of the laminate boards was measured to be 4.2% on the average when heating was continued 1,000 hours at a temperature of 240° C. The bending strength of the laminate boards accounted for 70% of the initial value. Measurement was also made of the electric properties of the sample laminate boards which were heated under varying conditions, the results being presented in Table 8 below.

Table 8

| | Volume resistivity (Ω·cm) | Dissipation factor (%) |
|---|---|---|
| 200° C × 1,000hrs. | $10^{15} <$ | 0.02 |
| 225° C × 1,000hrs | $8.7 \times 10^{14}$ | 0.18 |
| 240° C × 1,000hrs. | $6.5 \times 10^{13}$ | 0.45 |

EXAMPLE 9

35 parts of the maleimide polymer A of Example 1 (A), 15 parts of orthomethyl-n-phenylmaleimide, 25 parts of allylbisphenol F compound of Example 5 (A), 25 parts of the allylbisphenol A compound of Example 1 (B), 10 parts of EPN and 6 parts of methylnadic anhydride were thermally melted at a temperature of 80 to 105° C, followed by cooling to 60° C. 1 part of dicumyl peroxide and 2 parts of zinc octylate were added to the melted mixture, followed by thorough stirring, providing a solventless type resin composition.

The resin composition thus formed was casted in mold, and heated one hour at 130° C, 3 hours at 150° C and 10 hours at 180° C, providing a hardened resin board 1mm thick. A plurality of chips each measuring 10mm × 10mm were cut out of the molded resin board. Some of the sample chips were used to determine the heating weight loss and the remainder was offered to test the electric properties, the results being indicated in Table 9.

Table 9

| Item of measurement | Heating condition | Results |
|---|---|---|
| Heating weight loss (%) | 200° C × 1,000hrs. | 3.4 |
| | 250° C × 1,000hrs. | 7.1 |
| Volume resistivity (Ω·cm) | Room temperature | $> 10^{15}$ |
| | 180° C | $3.3 \times 10^{12}$ |
| Breakdown voltage (KV/mm) | Normal condition | 26.8 |
| | After dipped 5 hours in boiling water | 26.1 |

EXAMPLE 10

A 3-way 3l flask provided with a stirrer, thermometer and reflux condenser was charged with 279 parts of aniline and 730ml of an aqueous solution of 5 normal hydrochloric acid. 122 parts of 37% aqueous solution of formaldehyde were added over one hour with stirring at 80 to 105° C. The mixed solution were stirred 2 hours under reflux condition. A 10% aqueous solution of sodium hydroxide was added to precipitate an oily substance. Water and unreacted aniline were distilled out of the oily substance in vacuum. The residue was washed with water. After the water was removed, the desired polyamine compound was obtained which contained 15.9% of amine group and had a viscosity of 6,000 to 8,000 cps (at 25°C).

A maleimide compound C was prepared with an yield of 96% in substantially the same manner as in Example 1 (A), excepting that 900 parts of the above-mentioned polyamine were used.

Four kinds of solventless resin composition were prepared by blending the maleimide compound C thus obtained, the diallylbisphenol A compound of Example 1 (B), epoxy resin (Araldite EPN-1138) and in addition a hardening agent and hardening promoter in the proportions (parts by weight) given in Table 10 below.

A thermally hardened board was prepared from each of the four kinds of solventless resin composition as in Example 1. Measurement was made of the heating weight loss, volume resistivity and dissipation factor of the respective hardened resin boards, the results being presented in Table 10 below.

Table 10

| Component and Additive | | Sample No. | | | |
|---|---|---|---|---|---|
| | | 41 | 42 | 43 | 44 |
| Maleimide compound C | | 40 | 40 | 30 | 35 |
| Diallylbisphenol A compound | | 30 | 30 | 30 | 30 |
| Araldite EPN-1138 | | 17 | 20 | 25 | 20 |
| Hardening agent and hardening promoter | HN-2200 | 13 | — | 15 | — |
| | Diaminodiphenylmethane | — | 10 | — | 15 |
| | Dicumyl peroxide | 0.4 | 1.0 | 0.5 | 1.0 |
| | N-phenylimidazole | 0.2 | — | 0.1 | — |
| Heating weight loss(%) | 200° C × 1,000hrs. | 3.6 | 3.5 | 4.2 | 3.9 |
| | 250° C × 1,000hrs. | 5.8 | 5.7 | 6.9 | 6.6 |
| Volume resistivity | Normal | $>10^{15}$ | $>10^{15}$ | $>10^{15}$ | $>10^{15}$ |

Table 10-continued

| Component and Additive | | Sample No. | | | |
|---|---|---|---|---|---|
| | | 41 | 42 | 43 | 44 |
| ($\Omega$·cm) | 180° C | $8.4 \times 10^{13}$ | $8.8 \times 10^{13}$ | $4.5 \times 10^{13}$ | $8.0 \times 10^{13}$ |
| Breakdown voltage (KV/mm) | Normal | 25.4 | 24.8 | 25.0 | 26.2 |
| | After dipped in boiling water for 5hrs. | 24.8 | 24.1 | 24.4 | 25.5 |

What we claim is:

1. A heat-resistant resin composition which comprises
  (A) at least one maleimide polymer obtained by reacting maleic anhydride with polyphenyl polyamines containing the repeating units represented by the formula

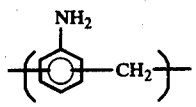

wherein said polyphenyl polyamines have 1 to 5 aniline units and have an amine content of 15 to 16.5% by weight and wherein said polyphenyl polyamines are produced by reaction between aniline and formaldehyde; and wherein in said reaction between maleic anhydride and polyphenyl polyamine, the ratio of amine equivalent to acid equivalent is 1:1 to 1:2;
  (B) at least one allylbisphenol compound represented by the formula:

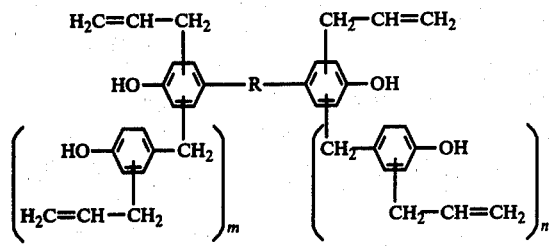

where R is -CH$_2$-radical or

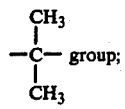

m and n are each independently zero, or an integer of 1, 2 or 3; each of the allyl groups is positioned ortho to each of the hydroxy groups, and in the case where R is

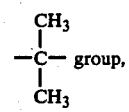

m and n respectively denote zero; and (C) at least one epoxy resin.

2. The heat-resistant resin composition according to claim 1, wherein said polyphenylpolyamines have a viscosity ranging between out 2,000 and 5,000 centipoises.

3. The heat-resistant resin composition according to claim 1, wherein said polyphenylpolyamines have a viscosity ranging between 8,000 and 30,000 centiposes.

4. The heat-resistant resin composition according to claim 2, wherein the amine radical content of the polyphenylpolyamines ranges between 15.5% by weight and 16.2% by weight.

5. The heat-resistant resin composition according to claim 3, where the polyphenylpolyamines is reacted with maleic anhydride in the equivalent ratio of 1:1 or more.

6. The heat-resistant resin composition according to claim 3, wherein the polyphenylpolyamine is reacted with maleic anhydride in the equivalent ratio ranging between 1:1.1 and 1:2.

7. The heat-resistant resin composition according to claim 1, wherein said maleimide polymer has a melting point ranging between about 80° C and about 130° C.

8. The heat-resistant resin composition according to claim 2, wherein R is

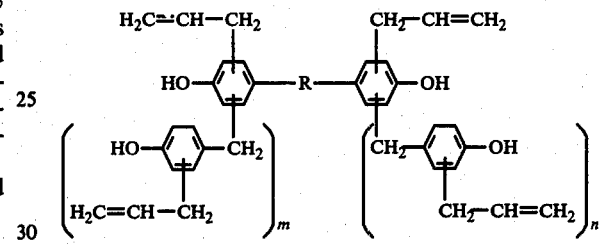

9. The heat-resistant resin composition according to claim 2, wherein R is —CH$_2$— group.

10. The heat-resistant resin composition according to claim 9, wherein m and n have a total of zero to four.

11. The heat-resistant resin composition according to claim 1, wherein the epoxy resin is produced by reaction between the component B and epihalohydrin.

12. The heat-resistant resin composition according to claim 1, wherein the epoxy resin is bisphenol A type epoxy resin, epoxy novolak type epoxy resin, cyclic epoxy resin or tetraglycidyl ether type epoxy resin.

13. The heat-resistant resin composition according to claim 1, wherein the component A has a proportion ranging between about 10 and about 85% by weight; the component B has a proportion ranging between about 5 and about 70% by weight; and the component C has a proportion ranging between about 5 and about 80% by weight.

14. The heat-resistant resin composition according to claim 12, wherein 60% by weight at maximum of the component A is substituted by at least one member selected from the group consisting of N,N'-substituted bismaleimides and N-substituted monomaleimides.

15. The heat-resistant resin composition according to claim 1, wherein the component A has a proportion ranging between about 30 and about 60% by weight; the component B has a proportion ranging between about 10 and about 40% by weight; and the component C has a proportion ranging between about 10 and about 40% by weight.

16. The heat-resistant resin composition according to claim 12, which contains at least one member selected from the group consisting of hardening agents and hardening promoters.

17. The heat-resistant resin composition according to claim 2, which is diluted with inert organic solvent of low boiling point.

* * * * *

UNITED STATES PATENT AND TRADEMARK OFFICE
CERTIFICATE OF CORRECTION

PATENT NO. : 4,131,632

DATED : December 26, 1978

INVENTOR(S) : SHUICHI SUZUKI ET AL

It is certified that error appears in the above-identified patent and that said Letters Patent are hereby corrected as shown below:

Column 4, line 17, after "Formula" insert --I--;

Column 5, line 26, after "reaction" insert --produced--;

UNITED STATES PATENT AND TRADEMARK OFFICE
CERTIFICATE OF CORRECTION

PATENT NO. : 4,131,632

DATED : December 26, 1978

INVENTOR(S) : SHUICHI SUZUKI ET AL

It is certified that error appears in the above-identified patent and that said Letters Patent are hereby corrected as shown below:

Column 6, line 58: (TABLE A Continued)

| Trade mark | Specific density (20°C) (about) | Melting point °C (as measured by Dullance method) | Polymerization degree (n) (about) | Average molecular weight (about) | Epoxy equivalent | Viscosity (at 25°C) cps or Gardner-Holdt value | Color (max) Gardner |
|---|---|---|---|---|---|---|---|
| Ciba | | | | | | | |
| Araldite GY 252 | 1.14 | | | | 180-200 | 700-1,100 | 2 |
| GY 250 | 1.17 | | | | 180-190 | 9,000-11,000 | 2 |
| GY 260 | 1.17 | | | | 180-200 | 12,000-26,000 | 2 |
| GY 280 | 1.17 | | | | 225-280 | $P - U^{(b)}$ | $2^{(a)}$ |
| 6071 | | | | | 450-500 | $D - F^{(a)}$ | $1^{(a)}$ |
| 6084 | | | | | 900-1,000 | $Q - U^{(a)}$ | $1^{(a)}$ |
| 6097 | | | | | 1,750-2,100 | $Y - Z_1^{(a)}$ | $1^{(a)}$ |
| 6099 | | | | | 2,400-3,300 | $Z_3 - Z_5^{(a)}$ | $1^{(a)}$ |
| CT 200 | | | | | 370-435 | | |
| 508$^{(4)}$ | | | | | | | |
| Dow | | | | | | | |
| D.E.R. 330 | 1.16 | - | | | 182-189 | 7,000-10,000 | 3 |
| 331 | 1.16 | - | | | 186-192 | 11,000-14,000 | 3 |
| 332 | 1.16 | - | | | 172-178 | 4,000-6,000 | 1 |
| 334 | 1.13 | - | | | 178-186 | 500-700 | 3 |
| 335 | 1.10 | - | | | 170-180 | 150-210 | 3 |
| 336 | 1.16 | - | | | 182-192 | 4,000-8,000 | 3 |
| 337 | 1.16 | - | | | 230-250 | $400-800^{(d)}$ | 3 |

UNITED STATES PATENT AND TRADEMARK OFFICE
CERTIFICATE OF CORRECTION

PATENT NO. : 4,131,632                     Page 3 of 8
DATED      : December 26, 1978
INVENTOR(S): SHUICHI SUZUKI ET AL It is certified that error appears in the above-identified patent and that said Letters Patent are hereby corrected as shown below:

| Trade mark | Specific density (20°C) (about) | Melting point °C (as measured by Dullance method) | Polymerization degree (n) (about) | Average molecular weight (about) | Epoxy equivalent | Viscosity (at 25°C) cps or Gardner-Holdt value | Color (max) Gardner |
|---|---|---|---|---|---|---|---|
| 660 | 1.15 | 65-74 | | | 425-475 | $D - G^{(c)}$ | $3^{(c)}$ |
| 661 | 1.16 | 70-80 | | | 475-575 | $G - J^{(c)}$ | $1^{(c)}$ |
| 662 | 1.15 | 80-90 | | | 575-700 | $A - I^{(c)}$ | $1^{(c)}$ |
| 664 | 1.14 | 95-105 | | | 875-975 | $R - V^{(c)}$ | $3^{(c)}$ |
| 667 | 1.15 | 113-123 | | | 1,600-2,000 | $Y - Z_1^{(c)}$ | $1^{(c)}$ |
| 668 | 1.15 | 120-140 | | | 2,000-3,500 | $Z_1 - Z_3^{(c)}$ | $3^{(c)}$ |
| 669 | 1.15 | 135-155 | | | 3,500-5,000 | $Z_3 - Z_6^{(c)}$ | $5^{(c)}$ |
| $732^{(4)}$ | | | | | 305-335 | 55-100 | 1 |
| $736^{(4)}$ | | | | | 175-205 | 30-60 | 1 |
| Epoxy phenol$^{(5)}$ novolak | 1.21 | | 0.2 | 370 | 172-179 | 1,400-2,000 (52°C) | 3* |
| | 1.23 | | 1.6 | 650 | 176-181 | 35,000-70,000 (52°C) | 2** |
| Epoxy bromide$^{(6)}$ | | | | | | | |
| 18-20% Br | - | 68-80 | | | 445-520 | $A - D^{(c)}$ | 6*** |
| 44-48% Br | 1.79 (25°C) | 51-61 | | | 350-400 | semisolid | 12**** |
| 18-20% Br Acetone solution (Including other solutions having different solvents and concentrations) | 1.15-1.25 | (resin content 79-81%) | | | 450-500 | 1,000-2,500 | 6**** |

UNITED STATES PATENT AND TRADEMARK OFFICE
CERTIFICATE OF CORRECTION

PATENT NO. : 4,131,632

DATED : December 26, 1978

INVENTOR(S) : SHUICHI SUZUKI ET AL

It is certified that error appears in the above-identified patent and that said Letters Patent are hereby corrected as shown below:

| Trade mark | Specific density (20°C) (about) | Melting point °C (as measured by Dullance method) | Polymerization degree(n) (about) | Average molecular weight (about) | Epoxy equivalent | Viscosity (at 25°C) cps or Gardner-Holdt value | Color (max) Gardner |
|---|---|---|---|---|---|---|---|
| Adeka resin EP-4000 [7] | 1.13-1.14 (25°C) | | | | 330-360 | 3,000-4,000 | - |
| Alicyclic epoxy resin Chissonox 201 [8] | 1.121 | - | | 280 | 152-156 | 1,800 | - |
| " 221 [9] | 1.173 | - | | 252 | 131-137 | 514 (20°C) | - |
| " 289 [10] | 1.124 | - | | 394 | 216-222 | 870 | - |
| " 206 [11] | 1.099 | - | | 140 | 74-78 | 7.77 (20°C) | - |
| " 207x [12] | 1.331(25°C) | 35-50 | | 164 | 82-85 | - | - |
| Araldite CY 178 | - | | | | 213 | 900 | 1 |
| CY 179 | - | | | | 140 | 350 | 1 |

\* Epikote 152, Araldite EPN 1139, D.E.N. 431 (Dow)
\*\* Epikote 154, Araldite EPN 1138, D.E.N. 438 (Dow)
\*\*\* Araldite 8011, D.E.R. 511
\*\*\*\* D.E.R. 542
\*\*\*\*\* Epikote 1045-A-80
\*\*\*\*\*\* Typical value

UNITED STATES PATENT AND TRADEMARK OFFICE
CERTIFICATE OF CORRECTION

PATENT NO. : 4,131,632

DATED : December 26, 1978

INVENTOR(S) : SHUICHI SUZUKI ET AL

It is certified that error appears in the above-identified patent and that said Letters Patent are hereby corrected as shown below:

(Note)
(1) Glycerin type
(2) Tetraglycidyl ether

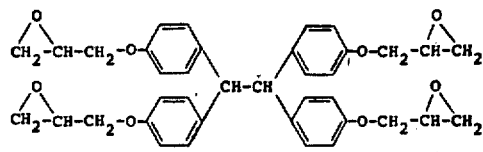

(3) Dimer acid type, trimer acid type, flexible
(4) Polyglycol type, flexible

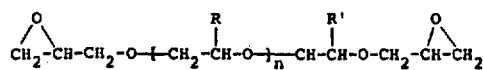

(5)

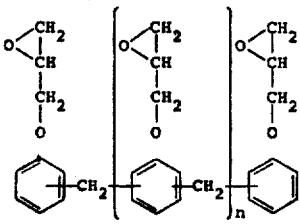

UNITED STATES PATENT AND TRADEMARK OFFICE
CERTIFICATE OF CORRECTION

PATENT NO. : 4,131,632

DATED : December 26, 1978

INVENTOR(S) : SHUICHI SUZUKI ET AL

It is certified that error appears in the above-identified patent and that said Letters Patent are hereby corrected as shown below:

(6) 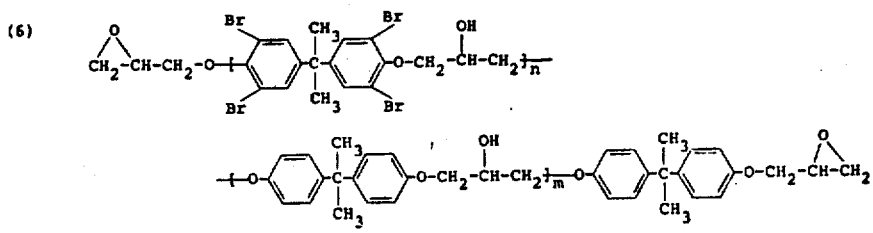

(7) Side chain type, flexible available from Adeka Co., Ltd.

(8) 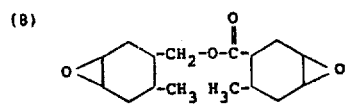

UNITED STATES PATENT AND TRADEMARK OFFICE
CERTIFICATE OF CORRECTION

PATENT NO. : 4,131,632

DATED : December 26, 1978

INVENTOR(S) : SHUICHI SUZUKI ET AL

It is certified that error appears in the above-identified patent and that said Letters Patent are hereby corrected as shown below:

(9) 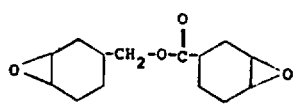

(10) 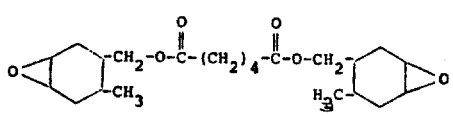

(11) 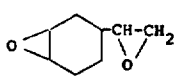

(12) 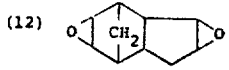

(a) 40% Butyl oxytol solution
(b) 70% "      "      "
(c) 40% Dowanol DB glycol ether solution
(d) 70% "      "      "

UNITED STATES PATENT AND TRADEMARK OFFICE
CERTIFICATE OF CORRECTION

PATENT NO. : 4,131,632
DATED : December 26, 1978
INVENTOR(S) : SHUICHI SUZUKI ET AL It is certified that error appears in the above-identified patent and that said Letters Patent are hereby corrected as shown below:

Column 17, Claim 2, line 3, delete "out";

Claim 2, line 3, delete "5,000" and insert --50,000--;

Column 18, Claim 8, delete the entire formula and insert

-- 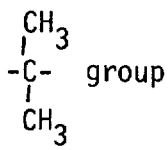 group --

Signed and Sealed this

Thirteenth Day of November 1979

[SEAL]

Attest:

RUTH C. MASON
*Attesting Officer*

LUTRELLE F. PARKER
*Acting Commissioner of Patents and Trademarks*